June 16, 1942.　　H. A. TUNSTALL ET AL　　2,286,697
RUBBER COMPOSITION
Filed April 26, 1939
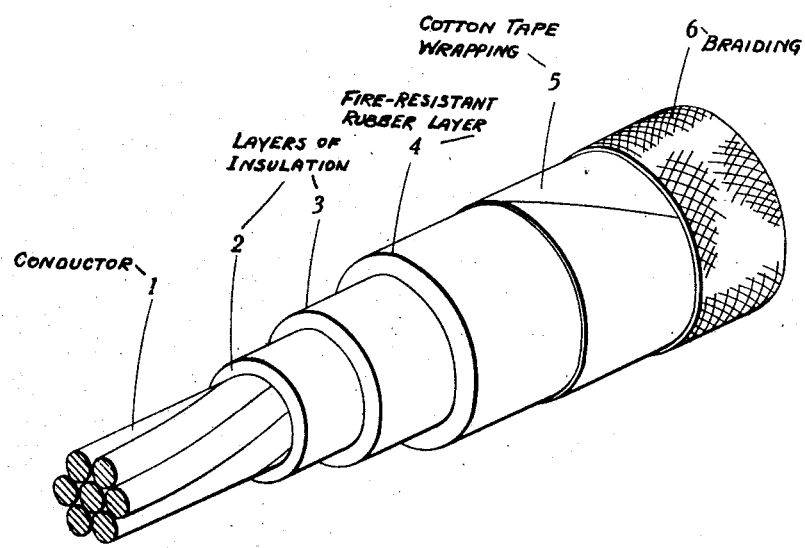
Inventors
HAROLD ARTHUR TUNSTALL and
BENJAMIN BEARDMORE EVANS
by
Attorneys Patented June 16, 1942

2,286,697

UNITED STATES PATENT OFFICE 2,286,697

RUBBER COMPOSITION

Harold Arthur Tunstall and Benjamin Beardmore Evans, Gravesend, England, assignors to W. T. Henley's Telegraph Works Company Limited, London, England, a British company Application April 26, 1939, Serial No. 270,130
In Great Britain May 16, 1938

11 Claims. (Cl. 260—738)

This invention deals with rubber compositions suitable for the purpose of insulating electric wire or cable or for other electrical insulating purposes. For such purposes it is desirable that the composition should possess adequate breakdown strength and good insulating resistance. These properties may readily be obtained by appropriate selection of the constituents of the composition. In some cases however, it is desirable that the rubber composition should possess fire resisting properties to a high degree, that is to say, that when subjected to the influence of an external source of ignition it should not transmit flame beyond the portion of the material under the influence of the source of ignition and should not continue to burn after being removed from the source of ignition. Fire-resistant rubber compositions are known which comprise, in addition to rubber and vulcanisation accessories therefor, chlorinated rubber and a material that is a solvent for the rubber and for chlorinated rubber. Unfortunately compositions of this kind are not satisfactory for dielectric purposes, their insulation resistance being much too low.

In accordance with the present invention rubber compositions having both excellent fire resistant properties and good electric properties can be obtained from insulating rubber mixes in which chlorinated rubber in powder form has been incorporated in the proportion of from 150-200 parts by weight of chlorinated rubber to each 100 parts of raw rubber, providing the mix is free or substantially free from material that acts either during the processing of the mix or subsequently as a solvent both for rubber and for chlorinated rubber.

The condition that the mix shall be free or substantially free from material that acts as a solvent both for rubber and for chlorinated rubber does not imply that a plasticiser may not be incorporated in the mix. To facilitate the processing of rubber mixes it is usually necessary to add a plasticiser. In many cases the plasticiser has some solvent action on rubber and chlorinated rubber, the extent of which naturally depends upon the particular substance or group of substances selected. In order that the mixes from which the improved compositions are obtained may in each case contain as little dissolved chlorinated rubber as possible, it will generally be found preferable to choose such plasticisers as have a low solvent action on rubber and chlorinated rubber, for instance, paraffin wax and stearic acid, and to avoid plasticisers that have a relatively high solvent action. Particularly is it desirable to avoid plasticisers, of this kind, such as chlorinated paraffin wax, that contain chlorine. Where a plasticiser, such as paraffin wax, which has little solvent action on rubber and chlorinated rubber and probably acts as a lubricant rather than a true plasticiser is used, a quantity amounting up to 5% of the weight of raw rubber present may be added without any material effect upon the insulation resistance of the resulting product.

The chlorinated rubber is preferably one containing about 65% by weight of chlorine. Such a chlorinated rubber is now sold under the registered trade-mark "Alloprene."

Chlorinated rubber is at present expensive as compared with the fillers hitherto employed in the production of rubber compositions for insulating purposes. We have discovered however that the quantity of chlorinated rubber can be reduced appreciably without any substantial reduction in the fire-resistant properties of the composition if an easily decomposable metal carbonate is added. In this specification the term "easily decomposable carbonate" is used to mean a carbonate that decomposes at temperatures between 250°–350° C. The preferred carbonate is light basic magnesium carbonate but other water insoluble carbonates may be used. The weight of easily decomposable carbonate added to replace a part of the chlorinated rubber content will naturally depend upon the density of the particular carbonate used. Where light basic magnesium carbonate is used the quantity added is preferably from 75%–110% of the weight of raw rubber present. Where a heavy carbonate such as white lead is used the weight added is proportionately greater. With such an addition of decomposable carbonate the chlorinated rubber content can be reduced to from 75%–110% of the weight of raw rubber. Whilst the addition of the carbonate appears to lower the electrical resistance of the resulting composition, the composition will still possess an insulation resistance that is more than adequate for most purposes.

The following are examples of rubber compositions in accordance with the invention, the proportion of the various constituents being expressed as parts by weight in each case.

*Example I*

| | |
|---|---|
| Rubber | 100 |
| Chlorinated rubber (65% chlorine) | 175 |
| Paraffin wax | 3.25 |
| Zinc oxide | 14.5 |
| Sulphur | 3.25 |
| Accelerator | 1.5 |

*Example II*

| | |
|---|---|
| Rubber | 100 |
| Chlorinated rubber (65% chlorine) | 100 |
| Magnesium carbonate | 100 |
| Paraffin wax | 3.25 |
| Zinc oxide | 14.5 |
| Sulphur | 3.25 |
| Accelerator | 1.5 |

In both examples the paraffin wax is added as a lubricant to facilitate the treatment of the mix prior to the vulcanising process. In each case the mix is vulcanised for 30 minutes at a temperature of 141° C.

The compositions obtained in accordance with the invention will not conitnue to burn after being removed from the source of ignition. They also have excellent electrical insulating properties. For instance, the insulation resistance of the composition obtained from the mix given in Example I is about $7,000 \times 10^6$ megohm/cm$^3$. The insulation resistance of the composition obtained from the mix given in Example II, which contains a high proportion of magnesium carbonate, is about $650 \times 10^6$ megohm/cm$^3$. which is appreciably lower than that of the composition obtained from the mix given in Example I but is nevertheless perfectly satisfactory. The good electrical resistance of the improved compositions is believed to be due to the fact that the chlorinated rubber is present in the form of discrete particles and has not entered into solution and become dissociated. This view is supported by evidence to the effect that the addition of a plasticiser that is a good solvent for rubber and chlorinated rubber to the mix given in Example II reduces the insulation resistance of the resulting composition to less than one twentieth of the value given above.

It has been found that compositions obtained from mixes which contain equal or approximately equal parts by weight of raw rubber, powdered chlorinated rubber containing about 65% chlorine and light basic magnesium carbonate, in addition to possessing a high degree of self-extinguishing properties, will also suppress flame from an adjacent rubber composition of the type normally used for insulating purposes and which itself is devoid of self-extinguishing properties. Thus it is possible to produce self-extinguishing rubber insulated cables having a wide range of electrical properties by varying the proportion of our improved fire-resistant rubber composition used for the dielectric. The accompanying drawing illustrates an insulated cable with a dielectric of this kind. The conductor 1 is insulated by a composite dielectric consisting of three superposed layers of insulation 2, 3 and 4. Surrounding the dielectric is a wrapping 5 of cotton tape and over this is a braiding 6. The innermost layer 2 may be of combustible rubber and the middle and outer layers of the improved fire-resistant rubber composition, or the inner and middle layers only may be of combustible rubber or all three layers may be of the improved fire-resistant composition. The drawing shows three layers of approximately equal radial thickness but it will be appreciated that it is by no means necessary that they should be so. An indication of the wide range of electrical properties that may be obtained by using such a composite dielectric is indicated in the following table which gives the tests results obtained on each of six samples of insulated conductor.

| | Samples | | | | | |
|---|---|---|---|---|---|---|
| | I | II | III | IV | V | VI |
| Size of conductor inches | 3/.036 | 3/.036 | 3/.036 | 7/.036 | 7/.036 | 7/.036 |
| Total thickness of insulant inches | 0.038 | 0.038 | 0.038 | 0.059 | 0.059 | 0.059 |
| Thickness of combustible rubber percent | 60 | 25 | 0 | 60 | 25 | 0 |
| Thickness of flame-resistant rubber percent | 40 | 75 | 100 | 40 | 75 | 100 |
| Insulation resistance megohms/1,000 yards | 4,800 | 2,000 | 500 | 6,500 | 1,800 | 900 |
| Period of burning after removal of flame seconds | 7–10 | 0 | 0 | 0–5 | 0 | 0 |
| Total length in inches of insulant burnt or charred | 4–5 | 4–5 | 4–5 | 3.5–4.5 | 3.5–4.5 | 3.5–4.5 |

The dielectric of samples I and IV consisted of two layers of combustible insulating rubber surrounded by one layer of the composition specified in Example II. In the case of samples II and V, the dielectric consisted of one layer of combustible insulating rubber surrounded by two layers of the composition specified in Example II. In samples III and VI the dielectric consisted of three layers of the composition specified in Example II. The fire resisting tests were carried out by removing all external coverings, clamping the samples vertically and applying for a period of 60 seconds the flame of a No. 20 Barthel burner of the type described in B. S. No. 738—1937.

What we claim as our invention is:

1. A process for producing a fire-resistant rubber composition having good electrical insulating properties, which comprises vulcanising a rubber mix which contains from 150–200 parts by weight of chlorinated rubber in power form to each 100 parts of raw rubber and is substantially free from material that acts, either during the processing of the mix or subsequently, as a solvent both for rubber and for chlorinated rubber.

2. A process for producing a fire-resistant rubber composition having good insulating properties, which comprises vulcanising a rubber mix which contains from 75–110 parts by weight of chlorinated rubber in powder form and 75-110 parts by weight of light basic magnesium carbonate to each 100 parts of raw rubber, and is substantially free from material that acts, either during the processing of the mix or subsequently, as a solvent both for rubber and for chlorinated rubber.

3. A process for producing a fire-resistant composition, claimed in claim 2, in which the light basic magnesium carbonate is replaced by an equivalent quantity of other easily decomposable insoluble metal carbonate.

4. A process for producing a fire-resistant rubber composition possessing good insulating properties, which comprises vulcanising a mix which contains raw rubber and powdered chlorinated rubber containing about 65% chlorine, the proportion of chlorinated rubber being about one and three quarter times the weight of raw rubber and the mix being substantially free from material that acts, either during the processing of the mix or subsequently, as a solvent both for rubber and for chlorinated rubber.

5. A process for producing a fire-resistant rubber composition possessing good insulating properties, which comprises vulcanising a mix which contains approximately equal parts by weight of raw rubber, powdered chlorinated rubber containing about 65% chlorine and light basic magnesium carbonate and which is substantially free from material that acts, either during the processing of the mix or subsequently, as a solvent both for rubber and for chlorinated rubber.

6. A process for producing a fire-resistant rubber composition having good electrical insulating properties, which comprises vulcanizing a rubber mix which contains from 150 to 200 parts by weight of chlorinated rubber in powder form to each 100 parts of raw rubber and is substantially free from rubber and chlorinated rubber dissolved in material that acts as a solvent both for rubber and for chlorinated rubber.

7. A process for producing a fire-resistant rubber composition having good insulating properties which comprises vulcanizing a rubber mix which contains from 75 to 110 parts by weight of chlorinated rubber in powder form and 75 to 100 parts by weight of light basic magnesium carbonate to each 100 parts of raw rubber and is substantially free from rubber and chlorinated rubber dissolved in material that acts as a solvent both for rubber and for chlorinated rubber.

8. A process for producing a fire-resistant composition claimed in claim 7 in which the light basic magnesium carbonate is replaced by an equivalent quantity of other easily decomposable water-insoluble metal carbonate.

9. A process for producing a fire-resistant rubber composition possessing good insulating properties, which comprises vulcanizing a mix which contains raw rubber and powdered chlorinated rubber containing about 65% chlorine, the proportion of chlorinated rubber being about one and three quarter times the weight of raw rubber and the mix being substantially free from rubber and chlorinated rubber dissolved in material that acts as a solvent both for rubber and for chlorinated rubber.

10. A process for producing a fire-resistant rubber composition possessing good insulating properties, which comprises vulcanizing a mix which contains approximately equal parts by weight of raw rubber, powdered chlorinated rubber containing about 65% chlorine and light basic magnesium carbonate and which is substantially free from rubber and chlorinated rubber dissolved in material that acts as a solvent both for rubber and for chlorinated rubber.

11. A fire-resistant vulcanized rubber composition having good electrical insulating properties comprising from 150 to 200 parts by weight of chlorinated rubber to each 100 parts by weight of rubber, the chlorinated rubber being present in the form of discrete particles.

HAROLD ARTHUR TUNSTALL.
BENJAMIN BEARDSMORE EVANS.